United States Patent
Mahajan

(10) Patent No.: US 9,746,334 B1
(45) Date of Patent: Aug. 29, 2017

(54) MODIFYING NAVIGATION INFORMATION FOR A LEAD NAVIGATION DEVICE AND A FOLLOW NAVIGATION DEVICE

(71) Applicant: Verizon Patent and Licensing Inc., Arlington, VA (US)

(72) Inventor: Amit Mahajan, Bridgewater, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 2 days.

(21) Appl. No.: 15/055,992

(22) Filed: Feb. 29, 2016

(51) Int. Cl.
*G21C 21/00* (2006.01)
*G01C 21/34* (2006.01)

(52) U.S. Cl.
CPC ............... *G01C 21/3438* (2013.01)

(58) Field of Classification Search
CPC .................................................. G01C 21/3438
See application file for complete search history.

(56) References Cited

U.S. PATENT DOCUMENTS

| | | | | |
|---|---|---|---|---|
| 5,400,248 A * | 3/1995 | Chisholm | ............... | G07C 13/00 235/386 |
| 8,965,692 B2 | 2/2015 | Chang et al. | | |
| 9,141,112 B1 * | 9/2015 | Loo | ....................... | G05D 1/0293 |
| 2013/0073377 A1 * | 3/2013 | Heath | ..................... | G06Q 30/02 705/14.39 |
| 2015/0360700 A1 * | 12/2015 | Cooper | .................... | B61C 17/12 701/2 |
| 2015/0375765 A1 * | 12/2015 | Mustard | .................. | B61L 99/00 701/19 |
| 2016/0075355 A1 * | 3/2016 | Kellner | .................. | B61L 25/028 701/2 |
| 2017/0090473 A1 * | 3/2017 | Cooper | ................ | G05D 1/0027 |

FOREIGN PATENT DOCUMENTS

NL          EP 0609928 A2 *  8/1994  ........... G05D 1/0005

* cited by examiner

*Primary Examiner* — Behrang Badii
*Assistant Examiner* — Daniel L Greene

(57) ABSTRACT

A device may determine a lead vehicle identifier and a follow vehicle identifier associated with navigating to a destination. The device may determine a plurality of device identifiers associated with the lead vehicle identifier or the follow vehicle identifier, identifying a plurality of devices. The device may determine navigation information. The device may provide the navigation information to a navigation device associated with a vehicle identifier. The device may receive a request to modify the navigation information. The device may determine a modification option. The device may provide the modification option to the plurality of devices for voting. The device may receive one or more voting responses. The device may determine a result of the voting based on the one or more voting responses. The device may provide, to the navigation device, an instruction associated with navigating to the destination based on the result of the voting.

20 Claims, 14 Drawing Sheets

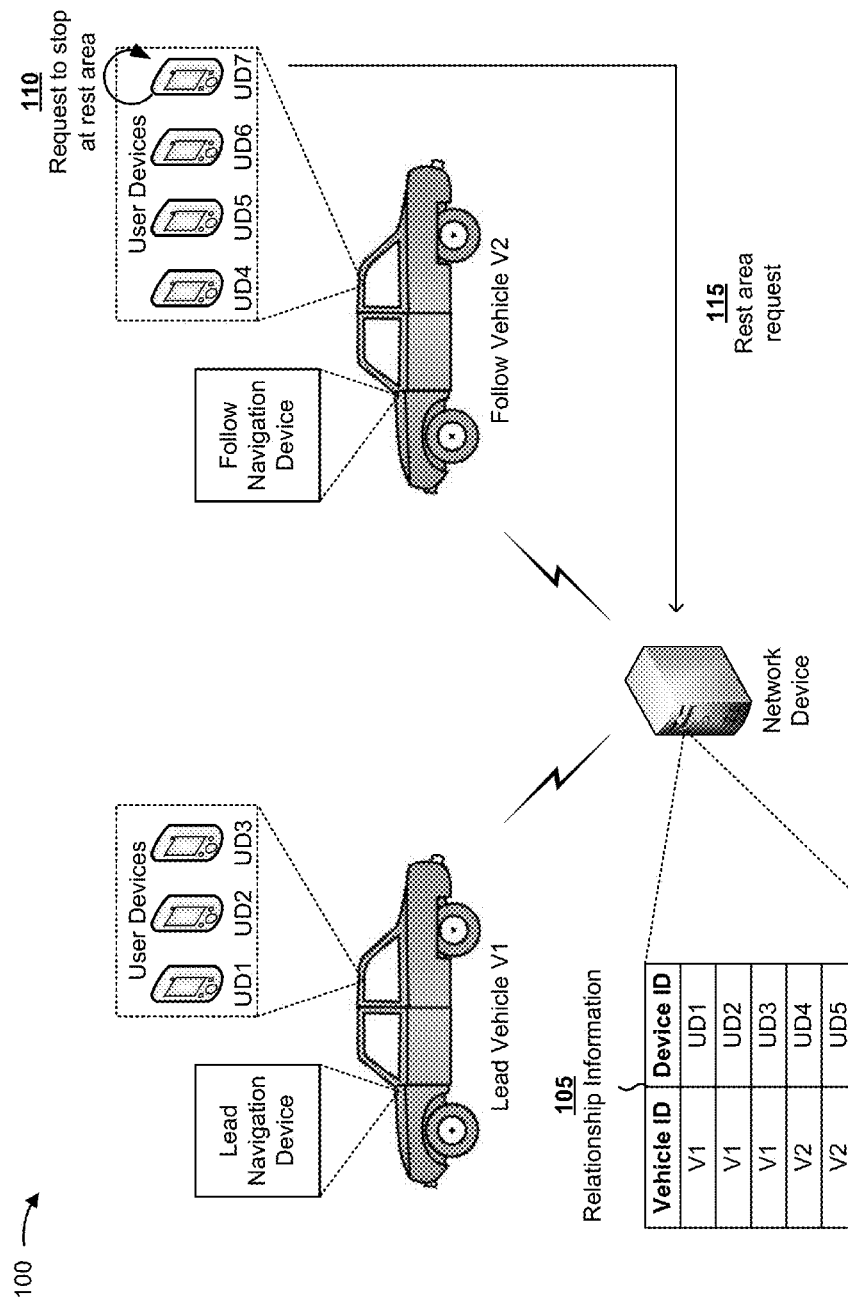

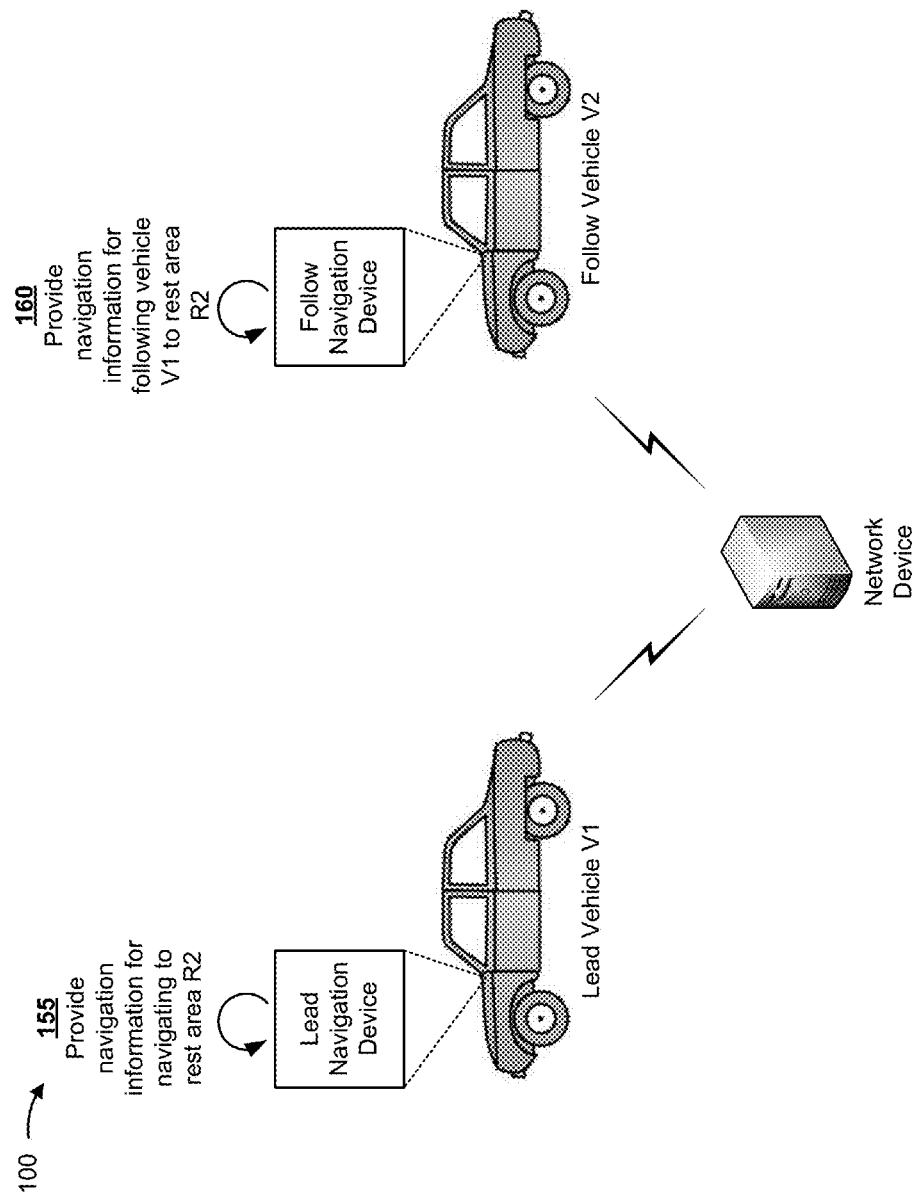

MODIFYING NAVIGATION INFORMATION FOR A LEAD NAVIGATION DEVICE AND A FOLLOW NAVIGATION DEVICE

BACKGROUND

A navigation device may be associated with a vehicle and/or a user device. The navigation device may determine a geographic location based on receiving information, such as from a satellite. In some implementations, the navigation device may provide maps and/or turn-by-turn navigation for display to a user of the navigation device, such as via a user interface. The navigation device may indicate available roads and/or paths, alternative routes, the locations of places of interest, or the like, via the user interface.

BRIEF DESCRIPTION OF THE DRAWINGS

FIGS. 1A-1H are diagrams of an overview of an example implementation described herein;

DETAILED DESCRIPTION OF PREFERRED EMBODIMENTS

The following detailed description of example implementations refers to the accompanying drawings. The same reference numbers in different drawings may identify the same or similar elements.

Multiple vehicles, with occupants, may be travelling to the same destination. Occupants of a first vehicle (e.g., a lead vehicle) may want to lead a second vehicle (e.g., a follow vehicle) to the destination. In some implementations, the lead vehicle may be associated with a lead navigation device and the follow vehicle may be associated with a follow navigation device. Additionally, or alternatively, the occupants of the lead vehicle and the follow vehicle may have user devices, such as smart phones.

While travelling to the destination, the lead vehicle may use the lead navigation device to determine a route to the destination, and the follow vehicle may use the follow navigation device to follow the lead vehicle along the route. In some cases, an occupant of either the lead vehicle or the follow vehicle may want to modify the route so as to make a stop (e.g., at a rest area, at a restaurant, or at a hotel) or take a detour. However, prior to modifying the route to make the stop, a user of the lead navigation device may want to solicit the opinions of the occupants of the lead vehicle and/or the follow vehicle, as some occupants may want to make a different stop, may not want to stop, may want to take a different detour, may not want to take a detour, or the like.

Implementations described herein enable occupants of a lead vehicle and/or a follow vehicle to use a user device to request that the lead vehicle modify a route while travelling to a destination and/or to provide an opinion about how to modify the route. In this way, the occupants of the lead vehicle and/or the follow vehicle may vote on a route modification before the modification is made, thereby conserving computer and/or processor resources associated with modifying the route multiple times. In addition, this may improve communications between the occupants of the lead vehicle and the follow vehicle when deciding how to modify the route, thereby reducing an amount of time spent by the occupants deciding how to modify the route.

Figure 1B:
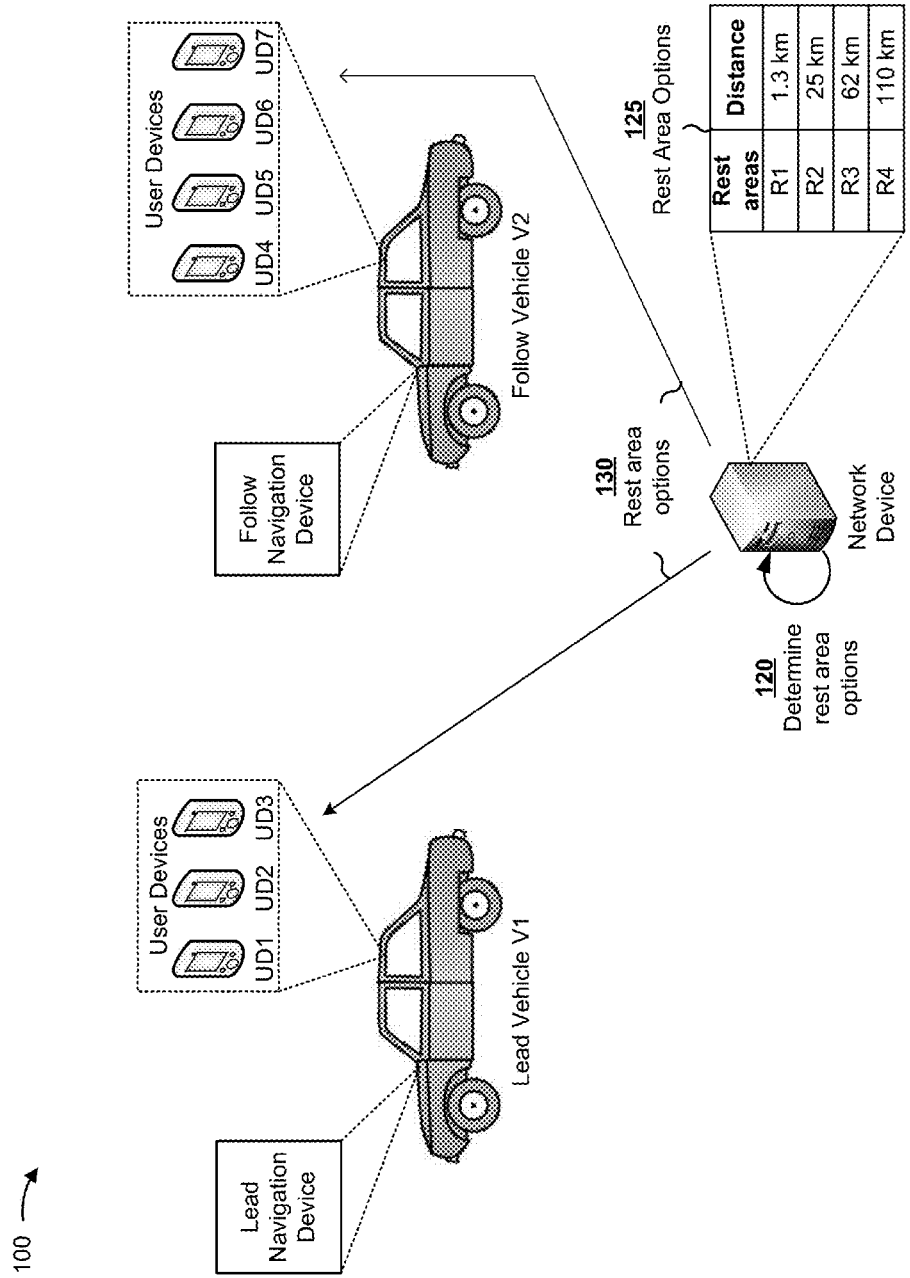

FIGS. 1A-1H are diagrams of an overview of an example implementation 100 described herein. As shown in FIG. 1A, a lead vehicle V1 may be leading a follow vehicle V2 along a route to a destination. As shown, a lead navigation device may be associated with lead vehicle V1 and a follow navigation device may be associated with follow vehicle V2. As further shown, multiple user devices (e.g., shown as user devices "UD1" through "UD7") may be associated with the lead vehicle V1 and/or follow vehicle V2. In some implementations, lead vehicle V1, at least one follow vehicle V2, and any associated devices (e.g., user devices and/or navigation devices) may be organized into a travel group, where, for example, the vehicles and devices in the travel group exchange geographic information (e.g., a location of the vehicles and/or devices), which may be provided for display via user interfaces associated with the devices.

As further shown in FIG. 1A, and by reference number 105, a network device may store relationship information that includes vehicle identifiers (e.g., shown as "V1" and "V2"), corresponding to vehicles, and associated user device identifiers (e.g., shown as "UD1" through "UD7"), corresponding to user devices. The network device may use the relationship information to communicate with the user devices, as described below. As shown by reference number 110, assume that a user device, such as user device UD7, sends a request that lead vehicle V1 stop at a rest area. As shown by reference number 115, user device UD7 may transmit the request to the network device.

As shown in FIG. 1B, and by reference number 120, the network device may determine rest area options (e.g., shown by reference number 125) that include rest area identifiers (e.g., shown as "R1" through "R4"), corresponding to rest areas, and distance information (e.g., shown as "1.3 km," "25 km," etc.), indicating a distance between the rest areas and lead vehicle V1 and/or follow vehicle V2. As shown by reference number 130, the network device may provide the rest area options to the user devices associated with lead vehicle V1 and/or follow vehicle V2 for voting, as described below.

Figure 1C:
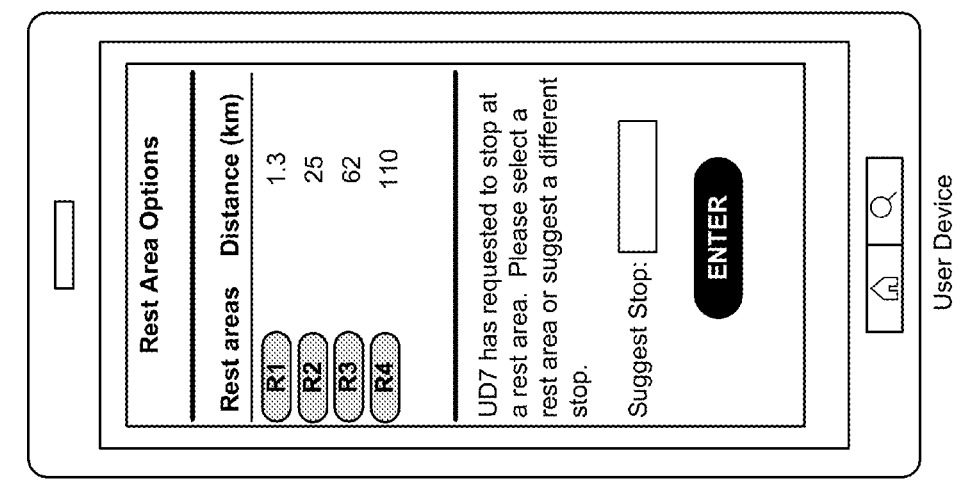

As shown in FIG. 1C, the user devices may provide the rest area options for display via a user interface associated with the user devices. Users of the user devices may vote to stop at a particular rest area by selecting a particular rest area option (e.g., shown as "R1" through "R4") from the displayed rest area options. Additionally, or alternatively, the users may input an alternative stop (e.g., a rest area option different from the displayed rest area options, such as a restaurant or a hotel) by inputting a name of the alternative stop via a text box and selecting the "Enter" button.

Figure 1D:
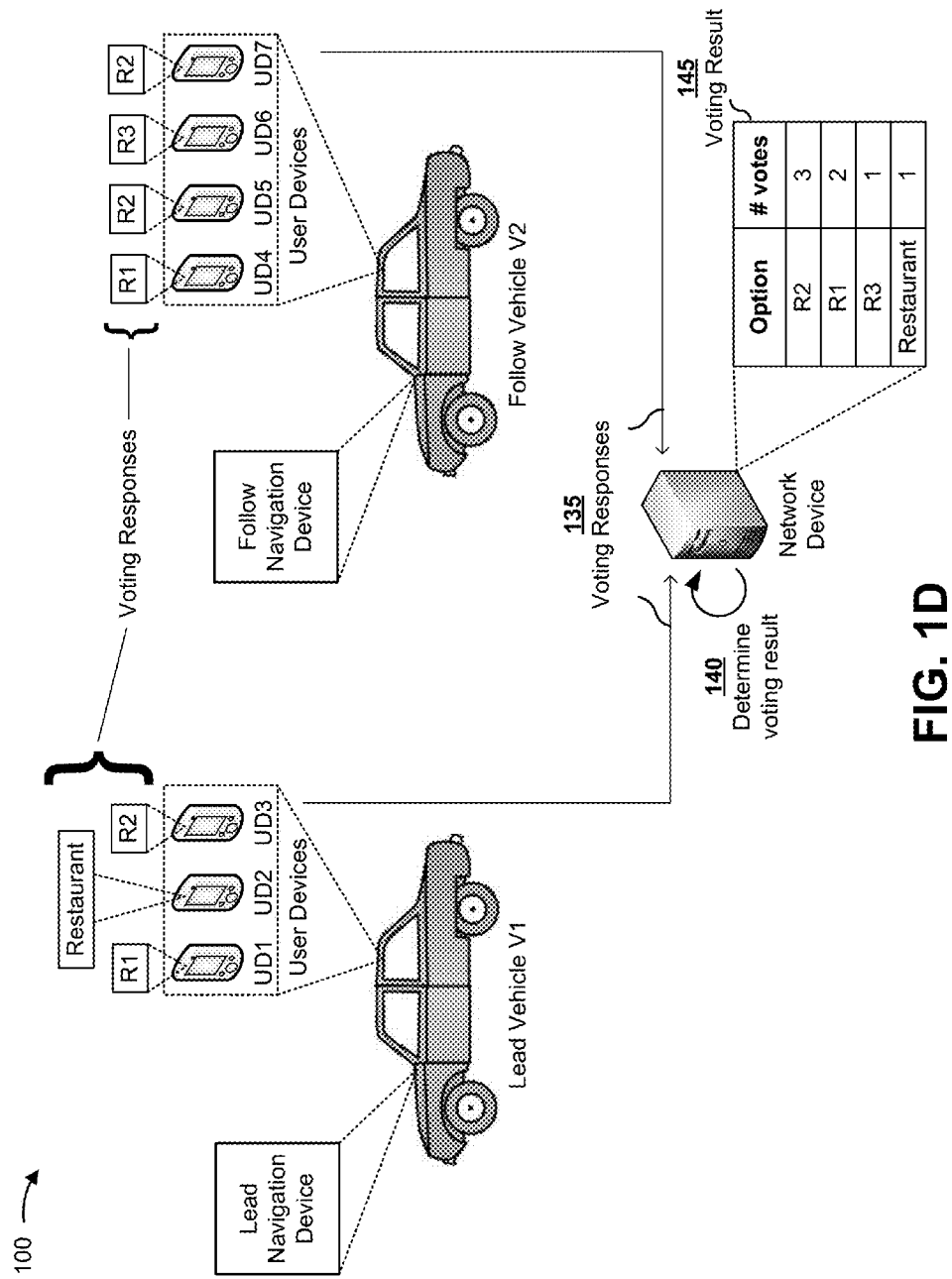

As shown in FIG. 1D, and by reference number 135, the network device may receive voting responses (e.g., votes) from the user devices. As shown by reference number 140, the network device may determine a voting result based on the voting responses (e.g., shown by reference number 145). The voting result may include rest area identifiers and a quantity of votes (e.g., "3," or "2") received for the rest areas. Additionally, or alternatively, the voting result may include information indicating alternative stops (e.g., shown as "Restaurant") received from the user devices and the quantity of votes received for the alternative stops.

Figure 1E:
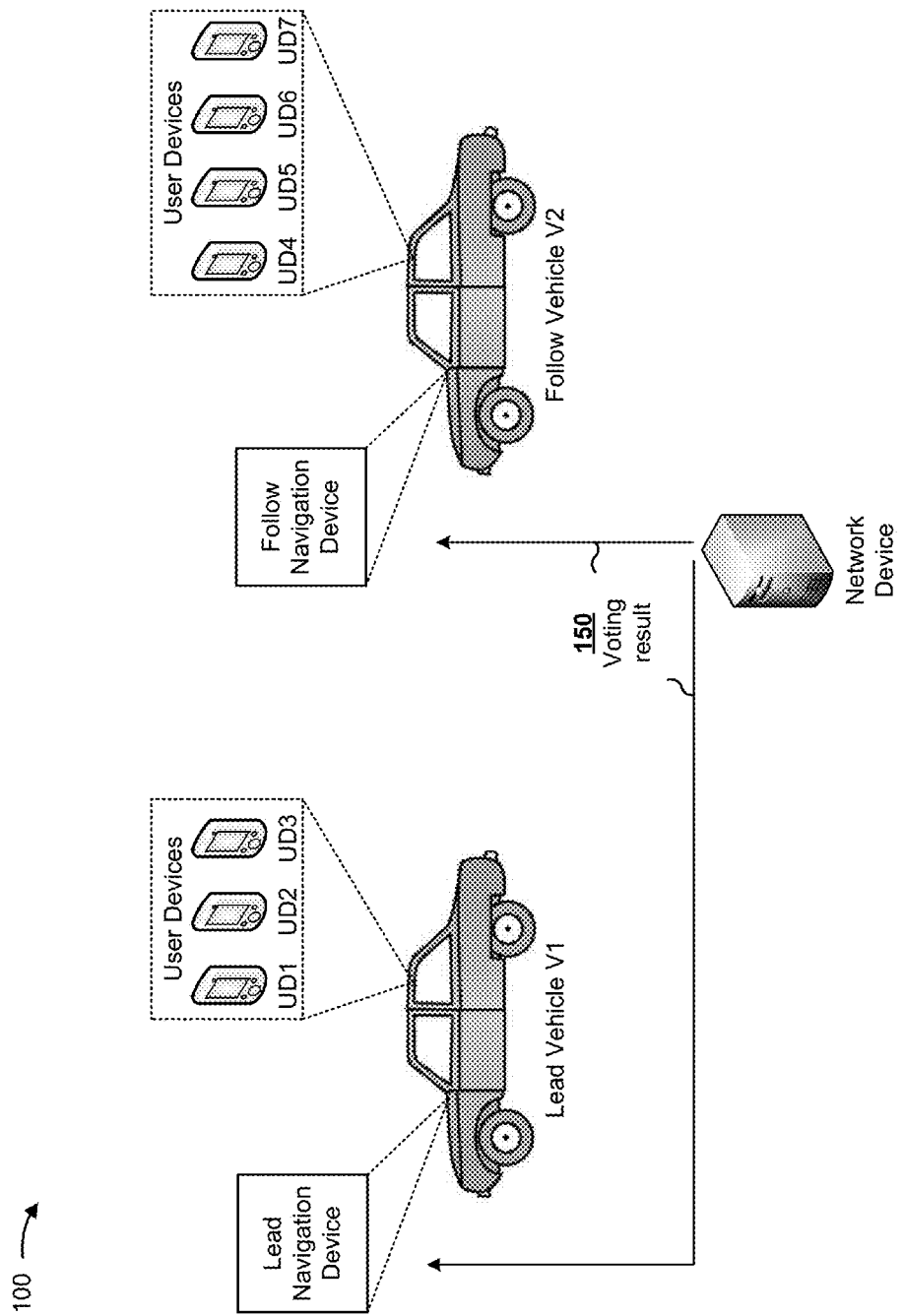

As shown in FIG. 1E, and by reference number 150, the network device may provide the voting result to the lead navigation device and/or the follow navigation device for display, such as via user interfaces associated with the lead navigation device and the follow navigation device (e.g., a user interface of an in-car navigation unit, a smart phone, or the like).

Figure 1F:
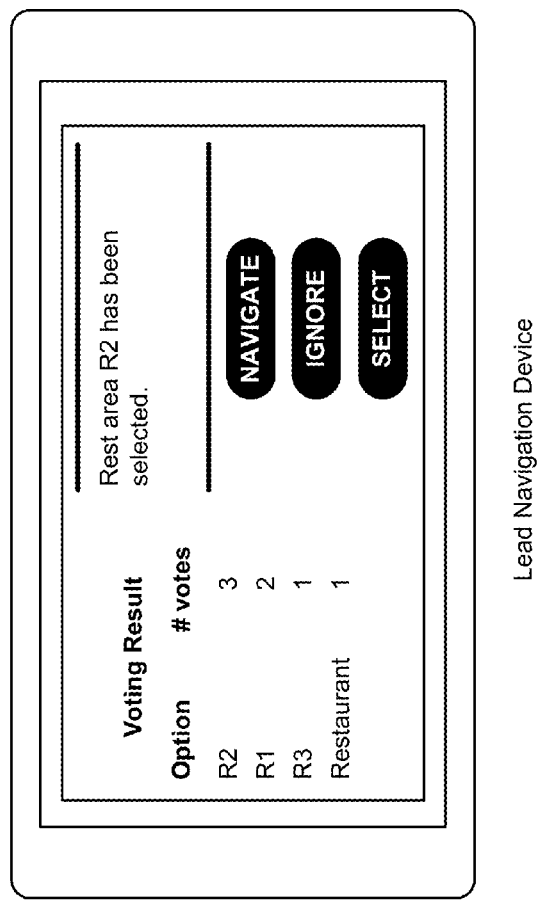

As shown in FIG. 1F, the lead navigation device may provide the voting result for display via a user interface associated with the lead navigation device. The user interface may permit a user of the lead navigation device to make a selection to navigate to rest area R2 (e.g., by selecting the "Navigate" button), to continue without stopping at any rest area (e.g., by selecting the "Ignore" button), or to select a rest area different from rest area R2 and/or select an alternative stop (e.g., by selecting the "Select" button). The lead navigation device may provide navigation information for display via the user interface associated with the lead navigation device based on the selection. In some implementations, the lead navigation device may automatically modify the navigation information based on the voting result (e.g., without permitting the user to continue without stopping, to select a different rest area, or to select an alternative stop).

Figure 1G:
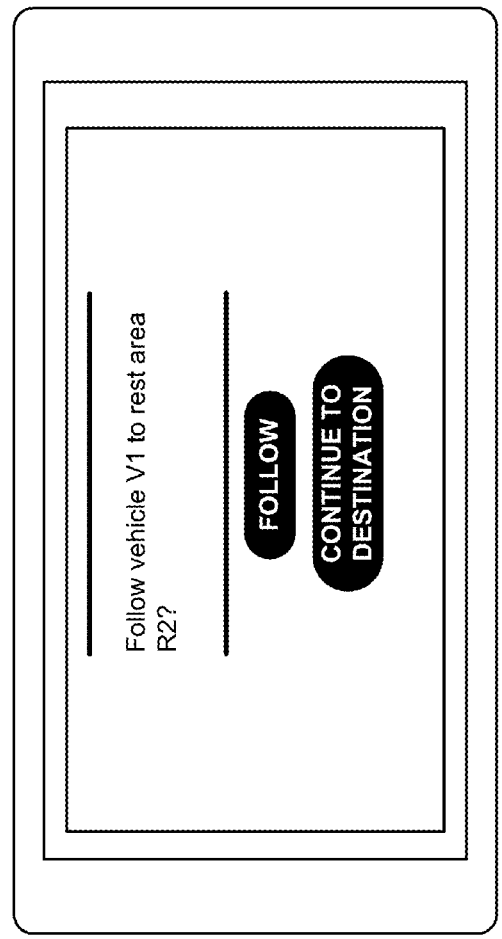

As shown in FIG. 1G, the follow navigation device may provide information indicating the voting result (e.g., in the form of a notification) for display via a user interface associated with the follow navigation device. The user interface may permit a user of the follow navigation device to make a selection to follow vehicle V1 to rest area R2 (e.g., by selecting the "Follow" button) or to continue to the destination separately from vehicle V1 (e.g., by selecting the "Continue to Destination" button). In some implementations, the follow navigation device may automatically modify the navigation information based on the voting result (e.g., without permitting the user of the follow navigation device to continue to the destination separately from vehicle V1).

As shown by FIG. 1H, and by reference number 155, the lead navigation device may provide, for display, navigation information for navigating to rest area R2, based on the user of the lead navigation device selecting the "Navigate" button. As shown by reference number 160, the follow navigation device may provide, for display, navigation information for following vehicle V1 to rest area R2 based on the lead navigation device receiving a selection to navigate to rest area R2 and the user of the follow navigation device selecting the "Follow" button.

In this way, a network device may permit an occupant of a vehicle to request that a lead vehicle modify a route while travelling to a destination and/or to provide an opinion about how to modify the route, via a user device. In this way, the occupant may vote on a route modification before the modification is made, thereby conserving computer and/or processor resources associated with modifying the route multiple times. In addition, this may improve communications between the occupants of multiple vehicles when deciding how to modify the route, thereby reducing time spent on making a decision about how to modify the route.

As indicated above, FIGS. 1A-1H are provided merely as an example. Other examples are possible and may differ from what was described with regard to FIGS. 1A-1H. For example, in some implementations, a network device may permit users of user devices to vote on whether to participate in a group activity to be shared among user devices associated with multiple vehicles (e.g., watching a movie, listening to music, playing a game, or group messaging). In this case, the users may vote to indicate an interest in participating in the group activity. Additionally, or alternatively, the users may vote on a specific group activity. In some implementations, the network device may provide access, to the group activity, to the user devices that have indicated an interest in participating in the group activity (e.g., by providing a movie or enabling group messaging).

As another example, the user devices may be directly connected (e.g., via device-to-device communications). This may enable a user device to share the movie, the music, or the game directly with the other user devices and/or to send group messages directly to the other user devices. As yet another example, push-to-talk channels may be established between devices included in a travel group (e.g., the navigation devices and/or the user devices). This may enable occupants of the vehicles to communicate without phone dialing. These and other implementations are described in more detail elsewhere herein.

Figure 2:
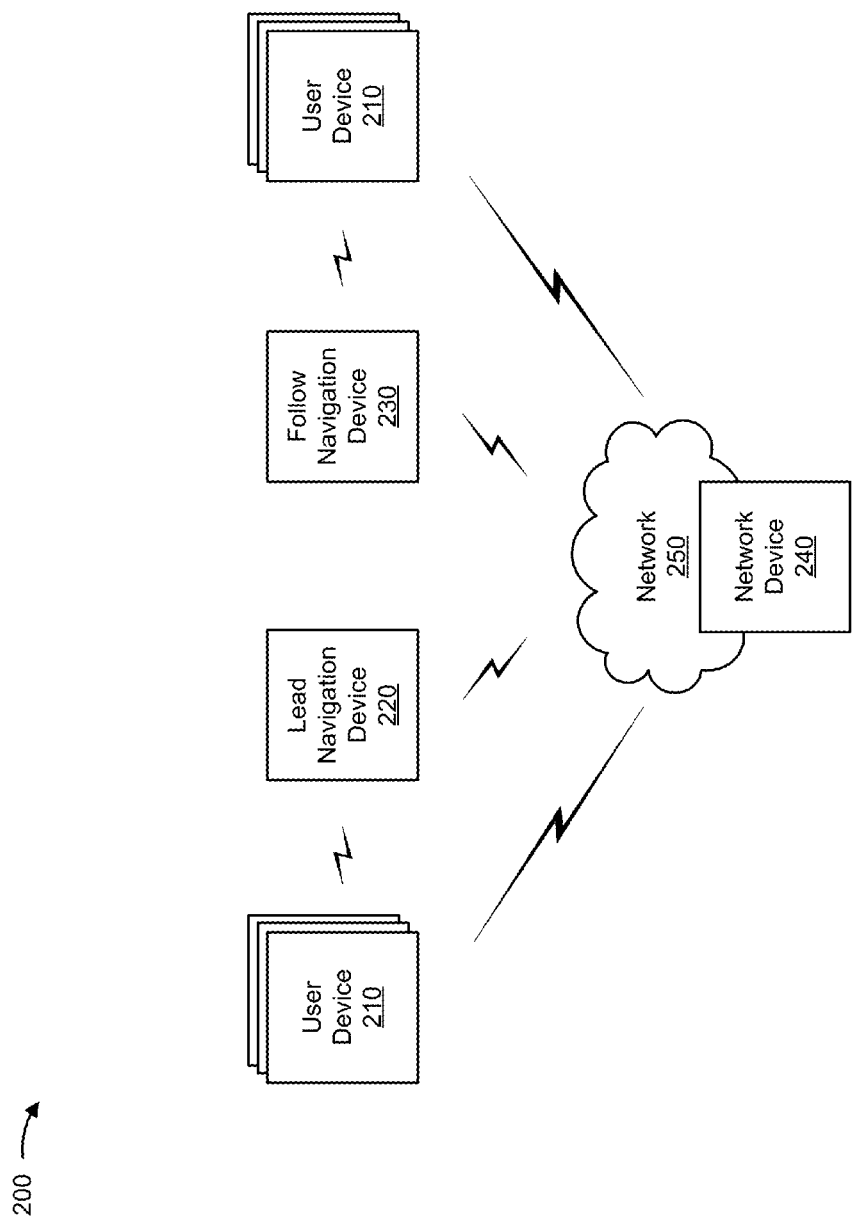
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include user device(s) 210, a lead navigation device 220, a follow navigation device 230, a network device 240, and a network 250. As used herein, the term "navigation device" may be used to refer to lead navigation device 220 and/or follow navigation device 230. Devices of environment 200 may interconnect via wired connections, wireless connections, or a combination of wired and wireless connections.

User device 210 includes one or more devices capable of communicating with lead navigation device 220, follow navigation device 230, and/or network device 240. For example, user device 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wrist watch or a pair of smart eyeglasses), and/or a similar device. User device 210 may send traffic to and/or receive traffic from network device 240 (e.g., via lead navigation device 220, follow navigation device 230, and/or network 250). In some implementations, user device 210 and a navigation device (e.g., lead navigation device 220 or follow navigation device 230) may be implemented in a single device. Additionally, or alternatively, a set of user devices 210 may be associated with a particular navigation device (e.g., user devices 210 in a vehicle equipped with the particular navigation device).

Lead navigation device 220 includes one or more devices capable of providing navigation information and communicating with user device 210, follow navigation device 230, and/or network device 240. For example, lead navigation device 220 may include a vehicle navigation system, a mobile device (e.g., a cell phone, a smart phone, or a personal digital assistant (PDA)), a computer device (e.g., a handheld computer, a laptop, or a tablet computer), and/or a similar device. In some implementations, lead navigation device 220 may be integrated with a vehicle and/or a device, such as user device 210. For example, lead navigation device 220 and user device 210 may be the same device, in some implementations. Additionally, or alternatively, lead navigation device 220 may be associated with a vehicle that is leading one or more other vehicles to a destination. In some implementations, lead navigation device 220 may function as follow navigation device 230.

Follow navigation device 230 includes one or more devices capable of providing navigation information and communicating with user device 210, lead navigation device 220, and/or network device 240. For example, follow navigation device 230 may include a vehicle navigation system, a mobile device (e.g., a cell phone, a smart phone, or a personal digital assistant (PDA)), a computer device (e.g., a handheld computer, a laptop, or a tablet computer), and/or a similar device. In some implementations, follow navigation device 230 may be integrated with a vehicle and/or a device, such as user device 210. For example, follow navigation device 230 and user device 210 may be the same device, in some implementations. Additionally, or alternatively, follow navigation device 230 may be associated with a vehicle that is following another vehicle to a destination. In some implementations, follow navigation device 230 may function as lead navigation device 220.

As an example, a navigation device may include a vehicle-implemented device capable of connecting to a cellular network (e.g., a long-term evolution (LTE) network). User device 210 may connect to the navigation device via a wireless local area network (WLAN) (e.g., a Wi-Fi network) or another type of network (e.g., a Bluetooth network), in some implementations. In this way, user device 210 may connect to the cellular network via the navigation device. Additionally, or alternatively, user device 210 may connect directly to the cellular network (e.g., via a cellular modem included in user device 210).

Network device 240 includes one or more devices capable of communicating with user device 210, lead navigation device 220, and/or follow navigation device 230 (e.g., via network 250). For example, network device 240 may include a server device or a similar type of device. In some implementations, network device 240 may receive, determine, store, and/or provide navigation information (e.g., routes, turn-by-turn directions, weather condition reports, traffic reports, and/or accident reports) or other information to user device 210, lead navigation device 220, and/or follow navigation device 230.

Network 250 includes one or more wired and/or wireless networks. For example, network 250 may include a cellular network (e.g., an LTE network, a 3G network, or a code division multiple access (CDMA) network), a public land mobile network (PLMN), a local area network (LAN), a wide area network (WAN), a metropolitan area network (MAN), a telephone network (e.g., a Public Switched Telephone Network (PSTN)), a private network, an ad hoc network, an intranet, the Internet, a fiber optic-based network, a cloud computing network, or the like, and/or combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
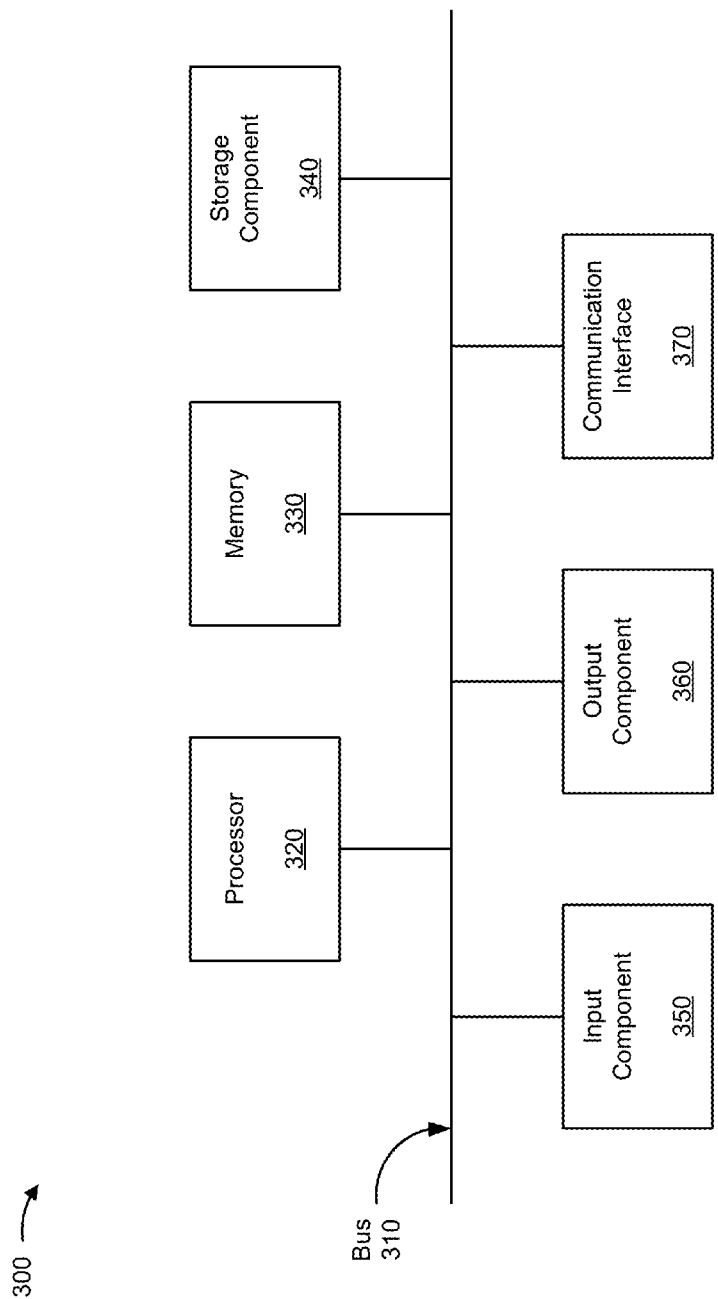
FIG. 3 is a diagram of example components of one or more devices of FIG. 2.

FIG. 3 is a diagram of example components of a device 300. Device 300 may correspond to user device 210, lead navigation device 220, follow navigation device 230, and/or network device 240. In some implementations, user device 210, lead navigation device 220, follow navigation device 230, and/or network device 240 may include one or more devices 300 and/or one or more components of device 300.

As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
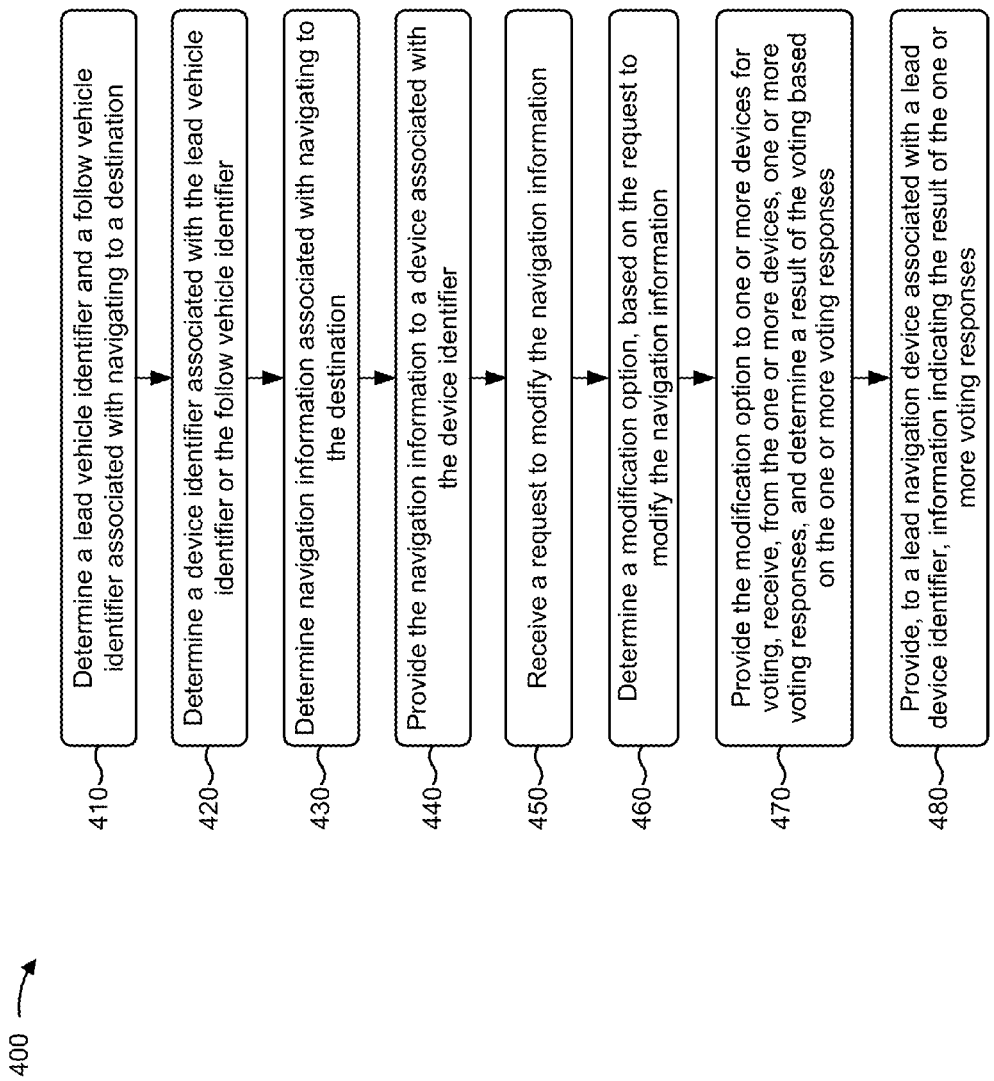
FIG. 4 is a flow chart of an example process for modifying navigation information for a lead navigation device and a follow navigation device.

FIG. 4 is a flow chart of an example process 400 for modifying navigation information for a lead navigation device and a follow navigation device. In some implementations, one or more process blocks of FIG. 4 may be performed by network device 240. In some implementations, one or more process blocks of FIG. 4 may be performed by another device or a group of devices separate from or including network device 240, such as user device 210, lead navigation device 220, and/or follow navigation device 230.

As shown in FIG. 4, process 400 may include determining a lead vehicle identifier and a follow vehicle identifier associated with navigating to a destination (block 410). For example, network device 240 may receive one or more vehicle identifiers (e.g., a value, such as a string or a number) that identify a vehicle. In some implementations, the vehicle identifier may identify the vehicle as a lead vehicle, leading another vehicle (e.g., a follow vehicle) to a destination, or a follow vehicle following another vehicle (e.g., a lead vehicle) to a destination.

In some implementations, network device 240 may determine the lead vehicle identifier and the follow vehicle identifier based on user input (e.g., provided via a navigation device). For example, network device 240 may determine that a user has input a vehicle identifier and has indicated a desire to lead or to follow the vehicle associated with the vehicle identifier. In some implementations, network device 240 may determine the vehicle identifier based on receiving, from a navigation device, a message (e.g., a confirmation message, a pre-configured message, a voice controlled message, a short message service (SMS) message, or a multi-media messaging service (MMS) message) that includes the vehicle identifier and indicates whether the vehicle associated with the vehicle identifier is a lead vehicle or a follow vehicle.

In some implementations, network device 240 may identify a vehicle as a lead vehicle or a follow vehicle based on a geographic proximity of the vehicles to the destination (e.g., closer to or further from the destination). For example, network device 240 may determine that a first vehicle is a lead vehicle and a second vehicle is a follow vehicle based on the first vehicle being in front of the second vehicle relative to the destination (e.g., closer to the destination). In this case, network device 240 may determine that a first vehicle identifier, associated with the first vehicle, is a lead vehicle identifier and that a second vehicle identifier, associated with the second vehicle, is a follow vehicle identifier. In some implementations, if the second vehicle passes the first vehicle (and, thus, becomes closer to the destination than the first vehicle), then network device 240 may determine that the second vehicle identifier is a lead vehicle identifier and the first vehicle identifier is a follow vehicle identifier.

In some implementations, network device 240 may receive a request from follow navigation device 230 to assume the lead when travelling to the destination. In this case, the follow vehicle may become a lead vehicle and network device 240 may update a vehicle identifier, associated with the former follow vehicle, to indicate that the follow vehicle has become the lead vehicle. Furthermore, network device 240 may update a vehicle identifier, associated with the former lead vehicle, to indicate that the lead vehicle has become the follow vehicle.

As further shown in FIG. 4, process 400 may include determining a device identifier associated with the lead vehicle identifier or the follow vehicle identifier (block 420). For example, network device 240 may determine a navigation device identifier (e.g., a value, such as a number or a string) that identifies a navigation device associated with the lead vehicle identifier and/or the follow vehicle identifier. Additionally, or alternatively, network device 240 may determine one or more user device identifiers (e.g., mobile directory numbers (MDNs)) that identify one or more user devices 210 associated with the lead vehicle identifier and/or the follow vehicle identifier (e.g., user devices 210 associated with occupants of the lead vehicle and/or the follow vehicle).

In some implementations, network device 240 may use stored relationship information to determine the navigation device identifier and/or the user device identifiers. For example, the stored relationship information may include navigation device identifiers, which correspond to navigation devices and/or user device identifiers, which correspond to user devices 210, and associated vehicle identifiers, which correspond to vehicles. In some implementations, network device 240 may use a navigation device identifier to communicate with the navigation device and/or a user device identifier to communicate with user device 210. For example, network device 240 may use the navigation device identifier to provide messages to a navigation device to confirm that the navigation device is to lead or to follow another navigation device. Additionally, or alternatively, network device 240 may use the navigation device identifier and/or the user device identifier to provide modification options (e.g. stops, such as waypoints, rest areas, restaurants, or hotels) for voting, as described below.

In some implementations, network device 240 may receive the relationship information via user input. Additionally, or alternatively, network device 240 may receive the relationship information from a navigation device. For example, the navigation device(s) may provide navigation device identifiers to network device 240. As another example, a navigation device may detect user devices 210 within communicative proximity to the navigation device and may provide user device identifiers associated with user devices 210 to network device 240.

In some implementations, the relationship information may include static device identifiers, such as when the relationship information includes navigation device identifiers that identify in-vehicle navigation devices. Additionally, or alternatively, the relationship information may include dynamic device identifiers, such as when the relationship information includes user device identifiers, where the user device identifiers that network device 240 receives may change based on the particular user devices 210 that are in communicative proximity with the navigation device.

As further shown in FIG. 4, process 400 may include determining navigation information associated with navigating to the destination (block 430) and providing the navigation information to a device associated with the device identifier (block 440). For example, network device 240 may determine routes, turn-by-turn directions, weather conditions, or traffic conditions associated with navigating to the destination. In some implementations, network device 240 may determine the navigation information to be used by both lead navigation device 220 and by follow navigation device 230, which may conserve computing and/or processor resources by eliminating the need for lead navigation device 220 and follow navigation device 230 to separately determine the same navigation information, such as when lead navigation device 220 is leading follow navigation device 230 to the destination.

In some implementations, network device 240 may provide the navigation information to a navigation device or user device 210. For example, network device 240 may provide the navigation information to multiple devices, such as lead navigation device 220 and follow navigation device 230. In some implementations, network device 240 may provide the navigation information to user device 210 associated with the lead vehicle and/or the follow vehicle (e.g., when user device 210 is functioning as lead navigation device 220 or follow navigation device 230).

In some implementations, network device 240 may provide the navigation information to lead navigation device 220, which may provide the navigation information directly to follow navigation device 230 (e.g., using a device-to-device communication), which may conserve network resources of network 250. In some implementations, network device 240 may provide the navigation information to both lead navigation device 220 and follow navigation device 230, which may conserve computing resources of lead navigation device 220.

In some implementations, network device 240 may provide the navigation information to the navigation devices as the vehicles are navigating to the destination (e.g., in real time). In some implementations, network device 240 may provide all navigation information to the navigation devices after determining the navigation information (e.g., to enable the lead vehicle and the follow vehicle to navigate to the destination separately). In some implementations, network device 240 may provide the navigation information to the navigation devices for output (e.g., via a user interface and/or speakers associated with the navigation devices). In some implementations, network device 240 may provide messages to the navigation devices, such as to update the navigation devices based on the geographic locations of the vehicles and/or the geographic proximity of the vehicles. In some implementations, the navigation devices may provide the navigation information for output so that users of the navigation devices may navigate to the destination.

As further shown in FIG. 4, process 400 may include receiving a request to modify the navigation information (block 450). For example, network device 240 may receive a request to stop at a particular location (e.g., a rest stop, restaurant, or gas station), to take a different route to the destination, to take a detour, to modify the destination, to stop at lodging, to avoid inclement weather, to avoid traffic, or the like. In some implementations, network device 240 may receive the request when a user of a navigation device and/or user device 210 requests to modify the navigation information via interaction with the navigation device and/or user device 210 (e.g., by using a user interface, a voice command, and/or a gesture command).

In some implementations, network device 240 may receive an automatic request to modify the navigation information. For example, a navigation device and/or user device 210 may automatically generate a request to modify the navigation information (e.g., to make a stop at a rest area or a fuel station) when an amount of time has elapsed, an amount of fuel has been consumed, and/or a length of distance has been travelled (e.g., relative to a threshold). As another example, the navigation device and/or user device 210 may detect a deviation from the navigation information and automatically request a modification to the navigation information (e.g., when the lead vehicle takes a detour without notifying the follow vehicle).

As further shown in FIG. 4, process 400 may include determining a modification option, based on the request to modify the navigation information (block 460). For example, network device 240 may determine one or more alternate routes to the destination, one or more alternate destinations, or one or more stops (e.g., waypoints, rest areas, restaurants, gas stations, or hotels) as modification options, and may provide information indicating the modification options. In some implementations, network device 240 may determine a modification option based on the request to modify the navigation information.

In some implementations, network device 240 may use information associated with the request to determine the modification option. For example, network device 240 may receive a type of request to modify the navigation information, such as a request to stop at a rest area, a restaurant, or a hotel. When network device 240 receives a type of request to modify the navigation information, network device 240 may determine specific modification options based on the type of request. For example, network device 240 may determine modification options that include specific rest areas, specific restaurants, or specific hotels when network device 240 receives a general request to stop at a rest area, a restaurant, or a hotel.

In some implementations, network device 240 may determine the specific modification options based on a geographic location of the lead vehicle. For example, network device 240 may receive a request, from a device associated with the follow vehicle, to stop at a restaurant. In this case, network device 240 may determine specific restaurants based on the geographic location of the lead vehicle, despite receiving the request from a device associated with the follow vehicle. For example, network device 240 may identify restaurants based on the relative distances, of the restaurants, from the geographic location of the lead vehicle. In some implementations, network device 240 may fail to identify restaurants along the route that the lead vehicle has already passed as modification options, even if the follow vehicle has not yet passed the restaurants. This may conserve computing resources of network device 240 by preventing network device 240 from modifying the navigation information to retrace a portion of the route. In addition, this may reduce an amount of time spent travelling to the destination for occupants of the lead vehicle, by preventing the lead vehicle from retracing a portion of the route.

Additionally, or alternatively, network device 240 may determine a modification option based on receiving a specific modification option in association with the request to modify the navigation information. For example, a user of the navigation device and/or user device 210 may provide a specific modification option (e.g., a specific waypoint, rest area, restaurant, or hotel) when requesting the modification. In this case, network device 240 may identify the specific modification option provided by the user as the modification option. In this way, network device 240 may conserve computing and/or processor resources by waiting for a request to modify the navigation information before modifying the navigation information.

As further shown in FIG. 4, process 400 may include providing the modification option to one or more devices for voting, receiving, from the one or more devices, one or more voting responses, and determining a result of the voting based on the one or more voting responses (block 470). For example, network device 240 may provide the modification option to a navigation device and/or user device 210.

In some implementations, network device 240 may provide the modification option to both lead navigation device 220 and follow navigation device 230. In turn, lead navigation device 220 may provide the modification option to one or more user devices 210 associated with lead navigation device 220, and follow navigation device 230 may provide the modification option to one or more user devices 210 associated with follow navigation device 230 (e.g., via a device-to-device communication). In some implementations, network device 240 may provide the modification option to one of lead navigation device 220 or follow navigation device 230, which may provide the modification option to the other of lead navigation device 220 or follow navigation device 230, thereby conserving computing resources of network device 240.

Additionally, or alternatively, network device 240 may provide the modification option to one or more user devices 210 associated with lead navigation device 220 and/or follow navigation device 230, which may conserve computing resources of the navigation devices. In some implementations, network device 240 may provide the modification option for output via the navigation devices and/or user devices 210. For example, a navigation device and/or user device 210 may provide the modification option for display (e.g., via a user interface and/or as sound or audio output via a speaker) based on receiving the modification option from network device 240. In some implementations, when the modification option is a change in destination, network device 240 may provide the modification option to all devices associated with a travel group so that each user can see the change in destination.

In some implementations, network device 240 may provide a single modification option to the one or more devices for voting. In this case, network device 240 may receive voting responses that indicate a quantity of votes for or against the single modification option. In some implementations, network device 240 may determine a quantity of votes for or against the modification option and may select or not select the modification option for providing to lead navigation device 220 based on the quantity of votes. For example, network device 240 may select the modification option when the quantity of votes for the modification option is higher than the quantity of votes against the modification option. As another example, network device 240 may not select the modification option or may provide a different modification option for voting when the quantity of votes against the modification option is higher than the quantity of votes for the modification option.

In some implementations, network device 240 may provide multiple modification options for voting. In some implementations, network device 240 may receive a voting response that indicates votes for one or more of the multiple modification options. In some implementations, network device 240 may determine a quantity of votes for the multiple modification options and/or a rank of the multiple modification options. In some implementations, network device 240 may select a modification option based on the quantity of votes or the rank (e.g., the modification option with the highest quantity of votes or the highest average rank of multiple ranks for the modification option) and provide the modification option to lead navigation device 220.

In some implementations, network device 240 may provide a subset of the multiple modification options for voting when none of the modification options receives a majority of the votes (e.g., provide modification options associated with the three highest quantities of votes or three highest average ranks of multiple ranks for the modification options). Additionally, or alternatively, network device 240 may determine that two or more modification options received the same quantity of votes and/or rank (e.g., tied). In some implementations, in the case of a tie, if the two or more modification options are also the modification options with the highest quantity of votes or the highest average rank, of multiple ranks for the modification options, then network device 240 may provide the two or more modification options for a re-vote.

In some implementations, network device 240 may permit the user to input an alternative modification option (e.g., a modification option different from the modification option(s) provided to the user). In some implementations, network device 240 may receive a voting response that indicates an alternative modification option. In this case, network device 240 may provide the alternative modification option to the navigation devices and/or user devices 210 for voting and/or determine a quantity of votes for the alternative modification option. In some implementations, network device 240 may select the alternative modification option and provide the modification option to lead navigation device 220 when the alternative modification option receives the highest quantity of votes or the highest rank (e.g., relative to other modification options).

In some implementations, network device 240 may permit the user to input multiple votes, such as when one or more occupants of a vehicle do not have access to the navigation device and/or user device 210. In some implementations, users of the navigation devices and/or user devices 210 may vote on the modification option by interacting with the navigation devices and/or user devices 210 (e.g., by using a user interface, a voice command, and/or a gesture command).

In some implementations, network device 240 may assign weights to votes from certain users more heavily than votes from other users (e.g., votes from adults are weighted more heavily than votes from children, or votes from a driver are weighted more heavily than votes from a passenger) when determining the result of the voting. In some implementations, network device 240 may store priority information that indicates which user devices 210 are associated with adults or children, and/or the driver or the passenger. Additionally, or alternatively, the hierarchy information may indicate the weights that user votes are to receive.

In some implementations, network device 240 may fail to receive a voting response from a navigation device and/or user device 210 within a threshold amount of time. In some implementations, network device 240 may determine that the failure to receive the voting response indicates an abstention from providing a voting response. Additionally, or alternatively, network device 240 may determine that the failure to receive the voting response indicates a vote for or against the modification option.

As further shown in FIG. 4, process 400 may include providing, to a lead navigation device associated with a lead device identifier, information indicating the result of the one or more voting responses (block 480). For example, network device 240 may provide the result (or information indicating the result) of the voting response to lead navigation device 220. In some implementations, network device 240 may provide the result to follow navigation device 230 and/or user device 210. In some implementations, network device 240 may provide the result for output via lead navigation device 220. For example, network device 240 may provide the result to a navigation device and/or user device 210 for display via a user interface and/or as sound or audio output via a speaker.

In some implementations, network device 240 may automatically modify, or automatically instruct the navigation device to modify, the navigation information based on the result (e.g., without providing a user of the navigation device an option to ignore the modification). For example, the result of the voting may indicate that the modification option was accepted (e.g., received a higher quantity of votes for the modification option than against the modification option) or that the modification option received the highest quantity of votes (e.g., relative to other modification options). In some implementations, when the modification option is accepted or the modification option receives the highest quantity of votes, network device 240 may automatically modify, or automatically instruct the navigation device to modify, the navigation information.

In some implementations, when the navigation information is automatically modified, the navigation device may automatically navigate the vehicle based on the modified navigation information, such as when the vehicle is a driverless vehicle. In some implementations, a user of lead navigation device 220 may determine whether to modify the navigation information based on the result of the voting response, which may conserve computing and/or processor resources of the navigation devices by permitting the user to prevent modification of the navigation information. For example, a user of lead navigation device 220 may determine to modify the navigation information based on the result, ignore the modification and continue to the destination, or select an alternative modification option not based on the result. In some implementations, network device 240 may not permit a user of the navigation device to override the automatic navigation of the vehicle by the navigation device.

In some implementations, a user of follow navigation device 230 may determine to follow lead navigation device 220 when lead navigation device 220 navigates using modified navigation information. Additionally, or alternatively, a user of follow navigation device 230 may determine to continue navigating to the destination when lead navigation device 220 determines to modify the navigation information, which may conserve computing and/or processor resources of follow navigation device 230 by having follow navigation device 230 continue to the destination. Additionally, or alternatively, a user of follow navigation device 230 may determine to navigate using an alternative modification option.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
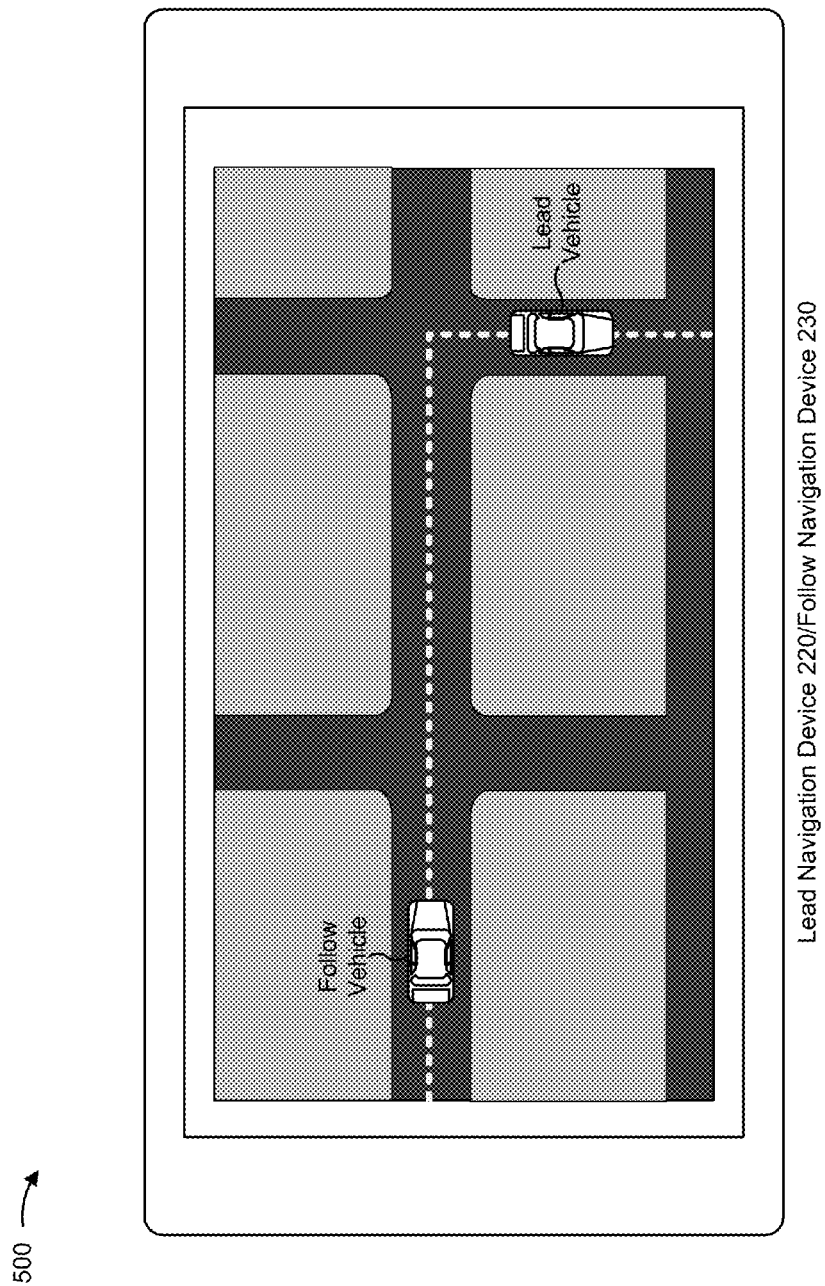
FIGS. 5A-5C are diagrams of an example implementation relating to the example process shown in FIG. 4.
Figure 5B:
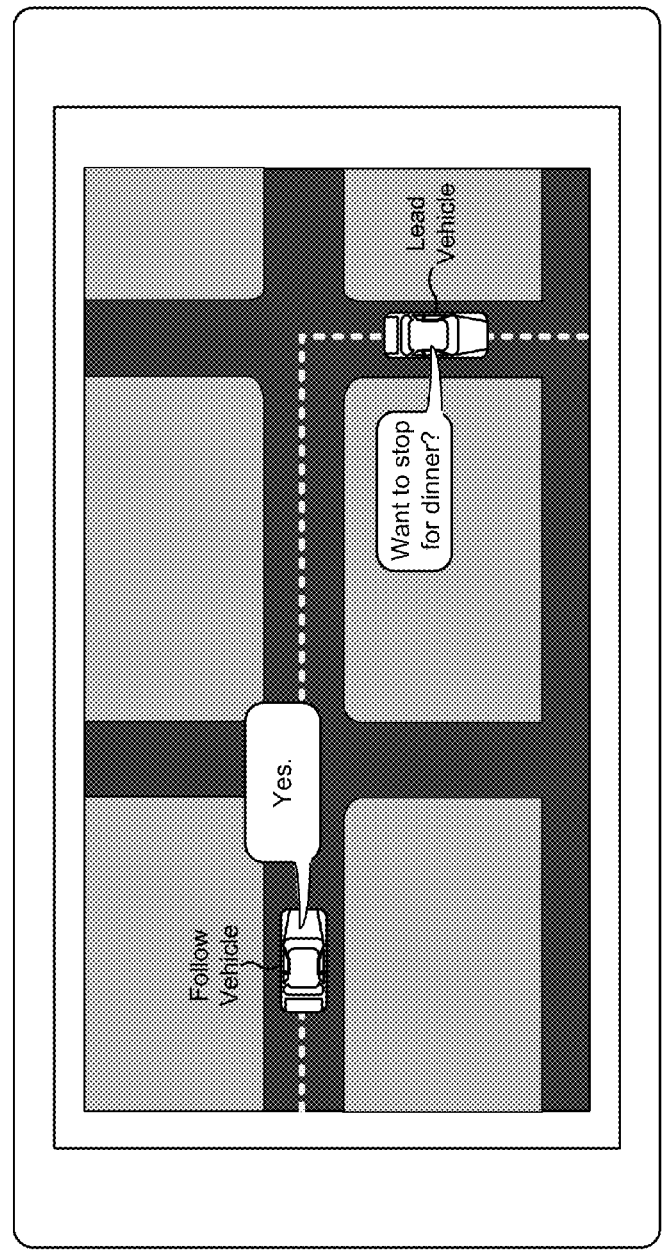
Figure 5C:
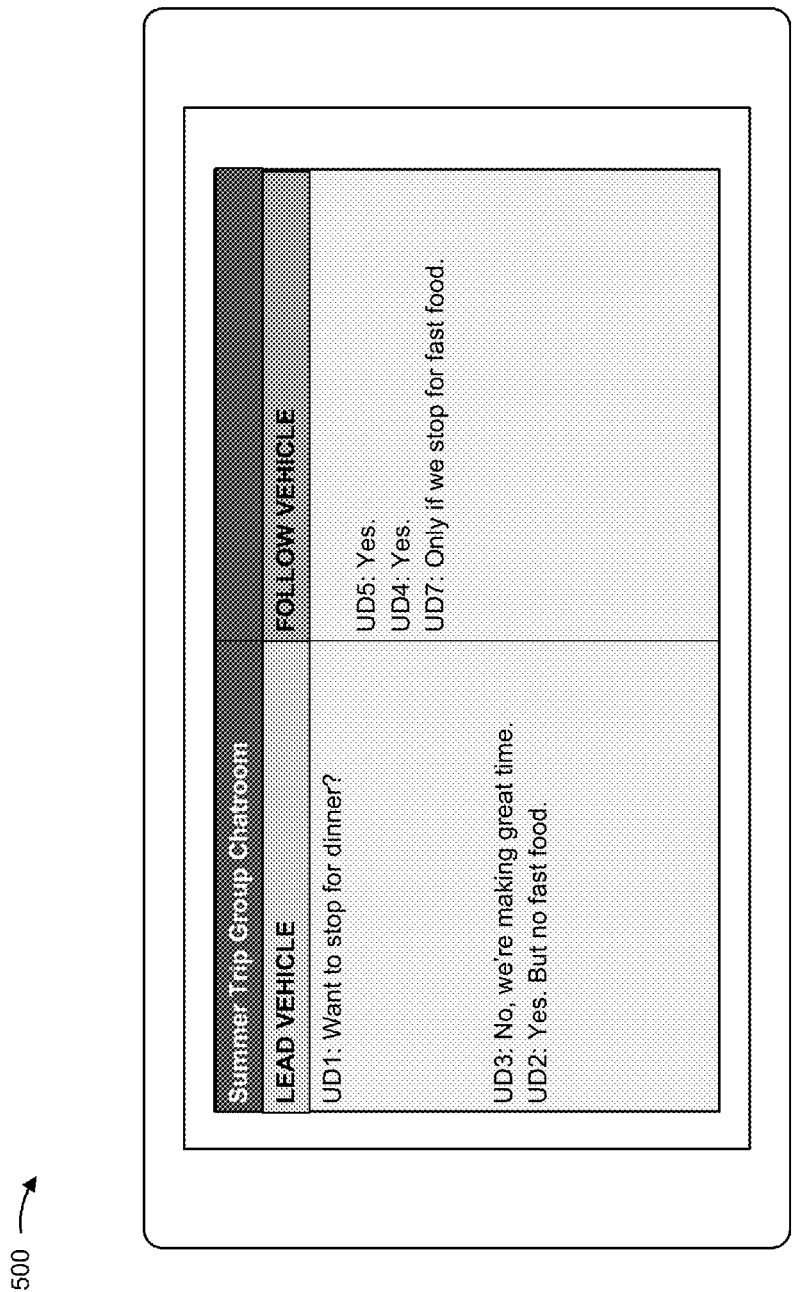

FIGS. 5A-5C are diagrams of an example implementation 500 relating to example process 400 shown in FIG. 4. As shown in FIG. 5A, lead navigation device 220 and/or follow navigation device 230 may provide a map for display (e.g., via a user interface). In some implementations, a navigation device may display icons or other visual representations for the lead vehicle and/or the follow vehicle. In some implementations, a navigation device may provide navigation information (e.g., a route, as shown by a dashed line) for display in association with providing the map for display. Although not shown, there may be multiple follow vehicles, in some implementations. In this case, the navigation device may provide an icon or other visual representation for each follow vehicle.

As shown in FIG. 5B, lead navigation device 220 and/or follow navigation device 230 may display messages sent from devices (e.g., navigation devices and/or user devices 210) associated with the lead vehicle and/or the follow vehicle. For example, a navigation device may display a message from a device associated with the lead vehicle that includes the text "Want to stop for dinner?" As further shown, for example, the navigation device may display a response message from a device associated with the follow vehicle that includes the text "Yes." In some implementations, the navigation device may display a message in association with an icon corresponding to a vehicle from which the message was sent, as shown.

As shown in FIG. 5C, lead navigation device 220 and/or follow navigation device 230 may provide a group chatroom for a travel group (e.g., shown as "Summer Trip Group Chatroom"). In some implementations, the navigation devices may display messages sent from devices associated with the lead vehicle (e.g., shown as messages from UD1, UD2, and UD3) and/or the follow vehicle (e.g., shown as messages from UD4, UD5 and UD7). Although not shown, there may be multiple follow vehicles, in some implementations. In this case, messages from devices associated with a first follow vehicle may be provided in association with an identifier of the first follow vehicle, messages from devices associated with a second follow vehicle may be provided in association with an identifier of the second follow vehicle, etc.

As indicated above, FIGS. 5A-5C are provided merely as an example. Other examples are possible and may differ from what was described with regard to FIGS. 5A-5C.

Implementations described herein may enable occupants of a lead vehicle and/or a follow vehicle to use a user device to request that the lead vehicle modify a route while travelling to a destination and/or to provide an opinion about how to modify the route. In this way, the occupants of the lead vehicle and/or the follow vehicle may vote on a route modification before the modification is made, thereby conserving computing and/or processor resources associated with modifying the route multiple times. In addition, this may improve communications between the occupants of multiple vehicles when deciding how to modify the route, thereby reducing time spent by the occupants deciding how to modify the route.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, or a position of information provided via the user interface). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
determine a lead vehicle identifier and a follow vehicle identifier associated with navigating to a destination,
the lead vehicle identifier identifying a lead vehicle traveling to the destination and the follow vehicle identifier identifying a follow vehicle traveling to the destination;
determine a plurality of device identifiers associated with the lead vehicle identifier or the follow vehicle identifier,
the plurality of device identifiers identifying a plurality of devices,
the plurality of devices including a first device associated with one of the lead vehicle or the follow vehicle;
determine navigation information associated with navigating to the destination;
provide the navigation information to at least one of a first navigation device, associated with the lead vehicle identifier, or a second navigation device, associated with the follow vehicle identifier;
receive, based on a user interaction with the first device, a request to modify the navigation information;
determine a modification option based on the request to modify the navigation information;
provide the modification option to the plurality of devices for voting;
receive one or more voting responses based on providing the modification option;
determine a result of the voting based on the one or more voting responses; and
provide, to at least one of the first navigation device or the second navigation device, an instruction associated with navigating to the destination based on the result of the voting.

2. The device of claim 1, where the one or more processors, when providing the modification option, are to:
provide the modification option to a plurality of user devices, or
provide the modification option to one or more navigation devices for providing to the plurality of user devices.

3. The device of claim 1, where the one or more processors, when determining the plurality of device identifiers, are to:
receive, from at least one of the first navigation device or the second navigation device, information that identifies a plurality of user devices in communicative proximity with the first navigation device or the second navigation device; and
determine the plurality of device identifiers based on receiving the information that identifies the plurality of user devices.

4. The device of claim 1, where the one or more processors, when providing the instruction, are to:
modify the navigation information, based on the result, to form modified navigation information; and
provide the modified navigation information to at least one of the first navigation device or the second navigation device for navigating to the destination.

5. The device of claim 1, where the modification option includes:
a waypoint,
a detour,
a fuel station,
a hotel,
a rest area, or
a restaurant.

6. The device of claim 1, where the one or more processors, when determining the result of the voting, are to:
determine a quantity of votes for the modification option;
determine a rank of the modification option, as compared to one or more other modification options, based on the quantity of votes; and
determine the result of the voting based on the rank.

7. The device of claim 1, where the one or more processors, when providing the navigation information, are to:
provide the navigation information to the first navigation device,
the first navigation device providing the navigation information directly to the second navigation device.

8. A non-transitory computer-readable medium storing instructions, the instructions comprising:
one or more instructions that, when executed by one or more processors, cause the one or more processors to:
determine a first navigation device identifier and a second navigation device identifier,
the first navigation device identifier and the second navigation device identifier corresponding to a first navigation device and a second navigation device, respectively, associated with navigating to a destination,
the first navigation device being associated with a lead vehicle traveling to the destination, and
the second navigation device being associated with a follow vehicle traveling to the destination;
identify at least one other device associated with the first navigation device or the second navigation device,
the at least one other device being associated with the lead vehicle or being associated with the follow vehicle;
determine navigation information associated with navigating to the destination;
provide the navigation information to at least one of the first navigation device or the second navigation device;
receive, based on a user interaction with at least one of the first navigation device, the second navigation device, or the at least one other device, a request to modify the navigation information;
determine a set of modification options based on the request to modify the navigation information;
provide the set of modification options to at least two of:
the first navigation device,
the second navigation device, or
the at least one other device;
receive a set of voting responses based on providing the set of modification options;
determine a result based on the set of voting responses; and
provide, to at least one of the first navigation device or the second navigation device, an instruction associated with navigating to the destination based on the result.

9. The non-transitory computer-readable medium of claim 8, where the one or more instructions, that cause the one or more processors to provide the set of modification options, cause the one or more processors to:
provide the set of modification options to:
the first navigation device,
the second navigation device, and
the at least one other device.

10. The non-transitory computer-readable medium of claim 8, where the one or more instructions, that cause the one or more processors to provide the instruction, cause the one or more processors to:
modify the navigation information, based on the result, to form modified navigation information; and
provide, to at least one of the first navigation device or the second navigation device, the modified navigation information.

11. The non-transitory computer-readable medium of claim 8, where the one or more instructions, that cause the one or more processors to provide the set of modification options, cause the one or more processors to:
provide multiple modification options; and
permit voting for one or more of the multiple modification options.

12. The non-transitory computer-readable medium of claim 8, where the set of voting responses includes:
a quantity of votes for a first modification option of the set of modification options, or
a rank of the first modification option, as compared to a second modification option, of the set of modification options.

13. The non-transitory computer-readable medium of claim 8, where the one or more instructions, that cause the one or more processors to provide the navigation information, cause the one or more processors to:
provide the navigation information to the first navigation device,
the first navigation device providing the navigation information directly to the second navigation device.

14. The non-transitory computer-readable medium of claim 8, where the request to modify the navigation information is automatically generated by at least one of the first navigation device, the second navigation device, or the at least one other device based on at least one of:
an amount of time having elapsed,
an amount of fuel having been consumed, or
a length of distance having been traveled.

15. A method, comprising:
determining, by a device, multiple vehicle identifiers associated with navigating to a destination,
a first vehicle identifier, of the multiple vehicle identifiers, identifying a lead vehicle traveling to the destination, and
a second vehicle identifier, of the multiple vehicle identifiers, identifying a follow vehicle traveling to the destination;
determining, by the device, multiple device identifiers associated with the multiple vehicle identifiers,
the multiple device identifiers being associated with multiple devices including:
at least one user device associated with at least one of the lead vehicle or the follow vehicle, and
at least one navigation device associated with at least one of the lead vehicle or the follow vehicle;
determining, by the device, navigation information,
the navigation information being associated with navigating to the destination;

providing, by the device, the navigation information to a navigation device of the at least one navigation device;

receiving, by the device and based on a user interaction with at least one of the at least one user device or the at least one navigation device, a request to modify the navigation information;

determining, by the device, at least one modification option based on the request to modify the navigation information;

providing, by the device, the at least one modification option to the multiple devices for voting;

receiving, by the device, at least one voting response based on providing the at least one modification option;

determining, by the device, a result of the voting based on the at least one voting response; and providing, by the device and to the at least one navigation device, a set of instructions for navigating to the destination based on the result of the voting.

16. The method of claim 15, further comprising:

providing, to the at least one navigation device, the result of the voting;

receiving, from the at least one navigation device, an indication to modify the navigation information based on the result;

determining modified navigation information based on receiving the indication; and forming the set of instructions based on the modified navigation information.

17. The method of claim 15, where receiving the at least one voting response comprises:

receiving a first voting response indicating a first vote for the modification option, receiving a second voting response indicating a second vote against the modification option, or receiving a third voting response indicating a third vote for another modification option that is different from the modification option.

18. The method of claim 15, where determining the result of the voting comprises:

failing to receive a voting response from at least one of the multiple devices; and determining the result of the voting based on failing to receive the voting response.

19. The method of claim 15, where providing the navigation information comprises:

providing the navigation information to a first navigation device, of the at least one navigation device, the first navigation device being associated with the lead vehicle, and the first navigation device providing the navigation information directly to a second navigation device, of the at least one navigation device, the second navigation device being associated with the follow vehicle.

20. The method of claim 15, where the request to modify the navigation information is automatically generated by at least one of the at least one user device and the at least one navigation device based on at least one of:

an amount of time having elapsed, an amount of fuel having been consumed, or a length of distance having been traveled.

* * * * *